Patented May 7, 1946

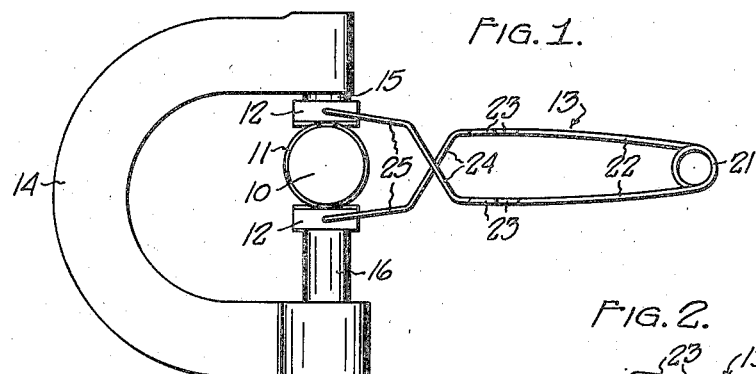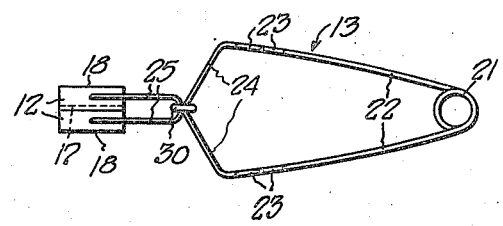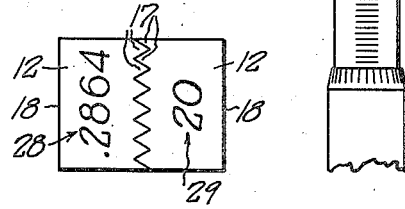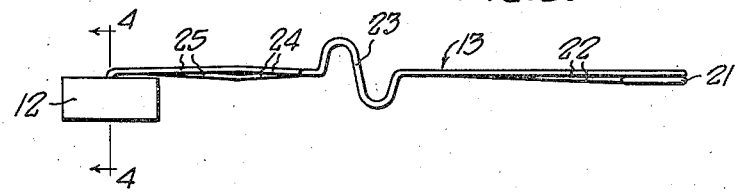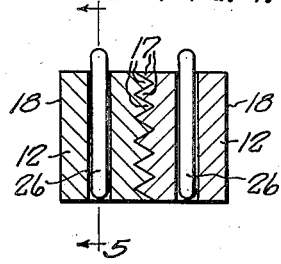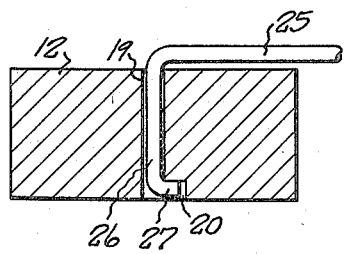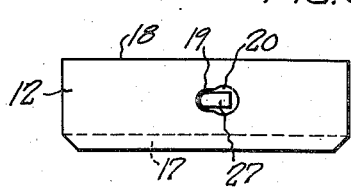

2,399,624

UNITED STATES PATENT OFFICE 2,399,624

THREAD DIAMETER GAUGE

Glave S. Bunch, Centre Township, St. Joseph County, Ind.

Application April 19, 1943, Serial No. 483,572

8 Claims. (Cl. 33—199)

This invention relates to improvements in thread diameter gauges.

The primary object of the invention is to provide a gauge for measuring an externally screw threaded member to determine accurately the pitch diameter thereof.

A further object is to provide a device of this character which is simple in construction, comparatively inexpensive, accurate to a high degree, and which can be manipulated and used quickly and easily.

A further object is to provide a device of this character including a pair of gauge blocks each having a serrated face machined accurately for tangential engagement with the threads of an externally screw threaded member, and resilient means mounting said blocks and normally holding said serrated faces in engagement.

A further object is to provide a device of this character including a pair of accurately machined gauge blocks each having a thread-engaging serrated face, and resilient means mounting said blocks for limited pivotal movement relative thereto.

A further object is to provide a device of this character which will resiliently clamp upon a threaded member to maintain operative position thereon.

Other objects will be apparent from the description, drawing and appended claims.

In the drawing:

Fig. 1 is a view illustrating the manner in which the device is used.

Fig. 2 is a top view of the device.

Fig. 3 is an enlarged side view of the device.

Fig. 4 is an enlarged detail sectional view taken on line 4—4 of Fig. 3.

Fig. 5 is an enlarged detail sectional view taken on line 5—5 of Fig. 4.

Fig. 6 is an enlarged detail view illustrating one face of a gauge block.

Fig. 7 is an enlarged end view of the gauge blocks.

Referring to the drawing, which illustrates the preferred embodiment of the invention, the numeral 10 designates a member having external screw threads 11 whose pitch diameter is to be measured. The gauge comprises a pair of gauge blocks 12 carried by a resilient mounting 13. A micrometer caliper 14 is employed to make the actual measurement, with the anvil 15 thereof bearing against the outer face of one gauge block, and the movable spindle 16 thereof bearing against the outer face of the other gauge block.

Each of the gauge blocks 12 is preferably rectangular and elongated. One longitudinal face of each block is milled and ground to provide a plurality of accurately shaped longitudinal serrations therein. The serrations 17 are formed with such accuracy as to mate exactly, or within the tolerances accepted for accuracy, a given screw thread. The face 18 of the block opposite the serrated face is finished to be exactly parallel to the median plane of serrations 17. Each block has a bore 19 formed centrally therein with its axis parallel to face 18 and perpendicular to serrations 17. A recess 20 is formed in one face of each block in communication with and projecting from the bore, preferably in a direction longitudinally of the block, for purposes to be set forth.

The member 13 which mounts the gauge blocks 12 is preferably constructed from spring wire similarly to spring tongs. The construction illustrated comprises a looped or coil portion 21 from which arms 22 project divergently in outwardly spring urged relation. Arms 22 may include portions 23 spaced from coil portion 21 and bent reversely in planes perpendicular to the plane of arms 22 to provide finger-engaging portions. Arms 22 are bent angularly inwardly from points adjacent the front of finger-engaging portions 23 to provide intersecting portions 24. The arms extend longitudinally in substantially parallel relation at 25 from the front ends of portions 24, and portions 26 are bent perpendicular to the plane of portions 25. Portions 26 are journaled in the bores 19 of the blocks to pivotally mount said blocks. Portions 26 terminate in perpendicularly bent ends 27 substantially parallel to portions 25 and seating in the recesses 20 in the blocks to retain the blocks on the mounting member. Recess 20 is so arranged and of such size and shape as to permit limited swinging movement of ends 27 therein, thus accommodating pivotal movement of the blocks on their mounting, but limiting the extent thereof to insure generally facing relation between the two blocks in all positions or adjustments of the mounting member.

The device normally assumes the position illustrated in Figs. 2 and 7, with the serrated faces of the gauge blocks 12 in engagement. Thus, the blocks protect the serrations from marring due to impact, etc., and also prevent accumulation of dirt on said serrations. When the device is used, it is grasped at finger-engaging portions 23, compressed to swing the gauge blocks apart, and fitted over the threaded member to be measured with the serrations 17 in tangential interfitting relation with threads 11 and the blocks in parallel relation and engaging the threaded member at diametrically opposed points. A measurement is then made with the micrometer 14. The pivotal mounting of the gauge blocks on the spring tongs permits said blocks to adjust themselves upon the threaded member in operative position. Likewise, the pivot-limiting arrangement 20—27 holds the blocks in substantially parallel relation to arm portion 25 whereby the blocks may slip over the threaded member readily without requiring handling thereof per se to properly mount them upon the threaded member. When the micrometer is properly positioned and adjusted to make the measurement, the surfaces of the anvil and spindle thereof which bear on block surfaces 18 will insure parallel positioning of said gauge blocks as required for accurate measurement.

The measurement taken by the micrometer will be the spacing between the outer surfaces 18 of the gauge blocks, and hence will include the thicknesses of the gauge blocks. To permit rapid determination of the pitch diameter of the threaded member, one of the gauge blocks of each device may have impressed, stamped or otherwise applied thereto indicia 28 designating the exact amount or dimension of said set of blocks which must be subtracted from the measurement taken to arrive at the desired determination. For example, in Fig. 7, the amount has been shown to be .2864 inch, the subtraction of which amount from any micrometer reading taken, will give the pitch diameter of the member being measured. One of the gauge blocks is also provided with indicia 29 which identifies the thread number for measurement of which the device is designed, i. e. the number of threads per inch, etc.

It will be apparent that the devices must be supplied in sets, the gauge blocks of each unit of the set having serrations of different size corresponding to a given thread number. However, only one micrometer is required, thus reducing materially the investment necessary to equip a shop to measure threads to different sizes or numbers, when compared to the investment necessary to acquire the number of conventional thread micrometers capable of measuring the same number of thread sizes. Another important advantage of the device is that it may be used to measure threads of a given size or number on shafts of a wide range of diameters. Thus, a device can be made to measure the threads on stock up to three-quarter inch in diameter, or even larger. The range will depend upon the throw of the tongs and the angular range of pivot movement of the blocks on the tongs, the latter of course being commensurate with the desired range of measurement to permit parallel positioning of the blocks at all adjustments of the tongs within the particular range.

For successful use of the device it is important that each of the gauge blocks be of a dimension to provide two or more serrations 17 on each block. This insures a solid tangential seating of the gauge on the threaded member longitudinally of the latter. The provision of multiple serrations on each block has the further advantage of giving a measurement of the average diameter of a number of threads along a section of the threaded member, and hence closely approaches measurement of the usable condition of the threaded member where its use with a nut threaded thereon or with an interior screw threaded part is considered.

The spring tongs type of mounting is of particular advantage to achieve a unitary device capable of quick and easy handling and manipulation. Thus, where the device is used for inspection of threaded members in a quantity production manufacturing operation, the inspector is able to work quickly therewith and to inspect a large number of parts in a given time, without sacrifice of full accuracy of measurement.

If desired, the spring tongs arrangement may include the use of a ring 30 (Fig. 2) loosely encircling the runs or portions 24 at the point of intersection thereof to prevent lateral dislocation of parts without interfering with free play or movement of the tongs.

While the invention has been illustrated and described for use in measuring external screw threads, the device may be adapted, with obvious minor alterations, such as the provision of a serrated point on the gauge blocks, to measure internal screw threads of diameters of one-half inch and larger.

I claim:

1. A thread diameter gauge comprising spring tongs and a pair of gauge blocks rotatably mounted on the ends of said tongs in substantially registering relation, each block having an accurately finished ridged face adapted for tangential engagement with an external screw thread and a plane face opposed and parallel to said ridged face.

2. A thread diameter gauge comprising a pair of rectangular gauge blocks each having a thread-engaging ribbed face and an opposed plane face, and a resilient member rotatably mounting said blocks at its ends and normally urging said blocks into substantially registering engagement at the ribbed faces thereof.

3. A thread diameter gauge comprising a pair of rectangular gauge blocks each having a thread-engaging surface with a plurality of equi-spaced parallel V-shaped grooves therein, and a resilient member having a pair of terminal portions rotatably mounting said blocks about axes parallel to said grooved face and perpendicular to the grooves thereof and normally urging them into engagement at said grooved faces.

4. A thread diameter gauge comprising a pair of rectangular gauge blocks each having a thread-engaging serrated face, a resilient member having terminal portions rotatably mounting said blocks and normally urging them into engagement at said serrated faces, and means for limiting rotation of said blocks on said terminal portions.

5. A thread diameter gauge comprising spring tongs formed of spring wire and including a pair of substantially parallel portions extending perpendicular to the plane of said tongs, and a pair of gauge blocks each having a serrated face and a bore parallel to the plane of said face and perpendicular to the serrations thereof, each of said parallel tong portions fitting in one of said bores to journal said blocks.

6. A thread diameter gauge comprising spring tongs formed of spring wire and including a pair of substantially parallel portions extending perpendicular to the plane of said tongs and terminal portions bent perpendicularly therefrom, and a pair of gauge blocks each having a bore therethrough and a recess in one face communicating with said bore, said bores each rotatably receiving one of said parallel tong portions and said recesses each loosely receiving one of said terminal portions to accommodate limited swinging of said terminal portions therein.

7. A thread diameter gauge comprising a pair of gauge blocks each having a serrated thread-engaging face, spring tongs having juxtaposed end portions rotatably mounting said blocks for bodily movement toward and from each other, and means for limiting rotation of said blocks on said end portions.

8. A thread diameter gauge comprising spring tongs formed of spring wire and including a pair of substantially parallel portions extending perpendicular to the plane of said tongs and terminal portions bent perpendicularly therefrom, and a pair of gauge blocks with serrations for engaging a threaded work piece each having a bore therethrough and a recess in one face communicating with said bore, said bores each rotatably receiving one of said parallel tong portions and said recesses each loosely receiving one of said terminal portions to accommodate limited swinging of said terminal portions therein.

GLAVE S. BUNCH.